(12) United States Patent
Wozniak

(10) Patent No.: US 10,829,194 B2
(45) Date of Patent: Nov. 10, 2020

(54) DRAINAGE SYSTEM FOR AN AIRCRAFT

(71) Applicant: Gulfstream Aerospace Corporation, Savannah, GA (US)

(72) Inventor: Gregg Wozniak, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 748 days.

(21) Appl. No.: 15/627,968

(22) Filed: Jun. 20, 2017

(65) Prior Publication Data
US 2018/0362136 A1 Dec. 20, 2018

(51) Int. Cl.
| B64C 1/14 | (2006.01) |
| B64D 11/02 | (2006.01) |
| B64D 1/16 | (2006.01) |
| B60R 15/04 | (2006.01) |
| B61D 35/00 | (2006.01) |

(52) U.S. Cl.
CPC ............ B64C 1/1453 (2013.01); B64D 11/02 (2013.01); *B60R 15/04* (2013.01); *B61D 35/007* (2013.01); *B64D 1/16* (2013.01)

(58) Field of Classification Search
CPC ......... B64C 1/1453; B64D 11/02; B64D 1/16; B60R 15/04; B61D 35/007
See application file for complete search history.

(56) References Cited

U.S. PATENT DOCUMENTS

| 2,248,308 A * | 7/1941 | Rice ........................ B64D 37/26 244/135 R |
| 2,463,662 A * | 3/1949 | Wallace ................. F01N 13/085 454/5 |
| 2,694,358 A * | 11/1954 | Taylor .................... F01N 13/085 454/5 |
| 4,463,774 A | 8/1984 | Gorges et al. |
| 5,290,996 A | 3/1994 | Giamati et al. |
| 5,655,732 A * | 8/1997 | Frank ..................... B64C 1/1453 239/171 |
| 9,315,253 B2 * | 4/2016 | Lee ........................ B64C 1/1453 |
| 9,428,271 B2 | 8/2016 | Becks et al. |
| 2005/0258392 A1 * | 11/2005 | Plinnl, Jr. ............... F16K 24/04 251/345 |
| 2006/0273224 A1 * | 12/2006 | Hoffjann ............... B64C 1/1453 244/136 |
| 2010/0032525 A1 * | 2/2010 | Piesker ................. B64C 1/1453 244/136 |
| 2014/0158208 A1 | 6/2014 | Becks et al. |
| 2016/0009358 A1 | 1/2016 | Gaudreau et al. |

FOREIGN PATENT DOCUMENTS

WO 0236426 A2 5/2002

* cited by examiner

*Primary Examiner* — Justin M Benedik
(74) *Attorney, Agent, or Firm* — LKGlobal | Lorenz & Kopf, LLP (57) ABSTRACT

A drainage system for an aircraft is taught herein. The drainage system includes a drain tube defining an orifice. The drainage system further includes a cover movable between a first cover position and a second cover position. The cover is configured to overlay the orifice when the cover is in the first cover position. The cover is configured to expose the orifice when the cover is in the second cover position. The cover is configured to move between the first cover position and the second cover position in the presence of air pressure.

20 Claims, 11 Drawing Sheets

DRAINAGE SYSTEM FOR AN AIRCRAFT

TECHNICAL FIELD

The present invention generally relates to vehicles and more particularly relates to aircraft drainage systems.

BACKGROUND

Aircraft commonly include one or more overboard drains to allow for discharge of fluids from the aircraft. Many of these drains are open-ended tubes that penetrate an exterior surface of the aircraft. During flight, the fluids are dispersed into the environment by the freestream air as the fluids egress out of the drain tube. However, due to the open-ended configuration of the drain tube, insects can build nests within the drain tube when the aircraft is on the ground thereby clogging the drain.

A conventional solution for preventing insects from entering the drain tube includes utilizing removable plugs. The plug is manually inserted into the drain tube when the aircraft is on the ground and the plug is manually removed from the drain tube prior to take-off the aircraft. While this solution, when utilized, does prevent ingress of insects into the drain tube, the insertion and removal of the plug is another set of steps that must be accounted for after landing and prior to take-off.

Accordingly, it is desirable to provide an improved drainage system. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a drainage system for an aircraft, and various non-limiting embodiments of an aircraft including a drainage system, are disclosed herein.

In one non-limiting embodiment, the drainage system includes, but is not limited to, a drain tube defining an orifice. The drainage system further includes, but is not limited to, a cover coupled to the drain tube and movable between a first cover position and a second cover position. The cover is configured to overlay the orifice when the cover is in the first cover position. The cover is configured to expose the orifice when the cover is in the second cover position. The cover is configured to move between the first cover position and the second cover position in the presence of air pressure.

In another non-limiting embodiment, the aircraft includes, but is not limited to, a drainage system. The drainage system includes, but is not limited to, a drain tube in fluid communication with the aircraft and defining an orifice. The drainage system further includes, but is not limited to, a cover coupled to the drain tube and movable between a first cover position and a second cover position. The cover is configured to overlay the orifice when the cover is in the first cover position. The cover is configured to expose the orifice when the cover is in the second cover position. The cover is configured to move between the first cover position and the second cover position in the presence of air pressure.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A drainage system for an aircraft is taught herein. In exemplary embodiments, the drainage system is in fluid communication with the aircraft for directing a fluid from the aircraft, through the drainage system, and to the environment. The drainage system includes a drain tube extending through the aircraft to the environment. The drainage system is further configured to direct a fluid to the drain tube and out of the drain tube to the environment. The drain tube defines an orifice for directing fluid out of the drain tube. The drain tube is configured to cooperate with the freestream air outside the aircraft to disperse the fluid egressing out the drain tube away from the aircraft. The drainage system further includes a cover movable between a first cover position and second cover position. The cover has a bias toward the first cover position. When the cover is in the first cover position, the cover is configured to sealably couple to the orifice to prevent ingress of an object into the orifice. When the cover is in the second cover position, the cover is configured to permit egress of a fluid through the orifice. The cover includes an extension portion extending beyond the orifice when the cover is in the first cover position. The extension portion is configured to cooperate with the freestream air to move the cover against the bias to the second cover position.

In one exemplary embodiment, the cover has a first side and a second side with the first side spaced from the second side such that the cover has a trapezoidal configuration. The first side is pivotably coupled to the drain tube and the cover is configured to pivot between the first cover position and the second cover position. The second side extends beyond the orifice to define the extension portion such that freestream pressure generated by the freestream air moves the cover against the bias from the first cover position to the second cover position. The cover includes a spring configured to cooperate with the cover and the drain tube to bias the cover toward the first cover position.

In another exemplary embodiment, the cover has a first side having a first side length and a second side having a second side length with the first side spaced from the second side such that the cover has a trapezoidal configuration. The first side is pivotably coupled to the drain tube and the cover is configured to pivot between the first cover position and the second cover position. The second side extends beyond the orifice to define the extension portion such that freestream pressure generated by the freestream air moves the cover against the bias from the first cover position to the second cover position. The cover is configured to bias toward the first cover position by gravity when the aircraft is on the ground. The orifice may be angled toward the aircraft to bias the cover toward the first cover position by gravity.

In another exemplary embodiment, the cover includes a base and a shell extending from the base. The shell is slidably coupled to the drain tube and the cover is configured to slide between the first cover position and the second cover position. The base and a portion of the shell define the extension portion such that freestream pressure generated by the freestream air moves the cover against the bias from the first cover position to the second cover position. The cover includes a spring configured to cooperate with the cover and the drain tube to bias the cover toward the first cover position.

In another exemplary embodiment, the cover includes a hinge portion and a lever portion extending from the hinge portion. The hinge portion is rotatably coupled to the drain tube and the cover is configured to rotate between the first cover position and the second cover position. The hinge portion defines a channel extending through the cover and is configured to receive the drain tube. The lever portion extends beyond the orifice to define the extension portion such that freestream pressure generated by the freestream air moves the cover against the bias from the first cover position to the second cover position. The cover includes a sealing component disposed in the channel. The sealing component has a closed state when the cover is in the first cover position and an open state when the cover is in the second cover position. The cover includes a spring configured to cooperate with the cover and the drain tube to bias the cover toward the first cover position.

A greater understanding of the system described above may be obtained through a review of the illustrations accompanying this application together with a review of the detailed description that follows. Like elements of various embodiments of the disclosure may be given numbers incremental by 100. For example, it is to be appreciated that element number 22 may also refer to 122 or 222.

Figure 1:
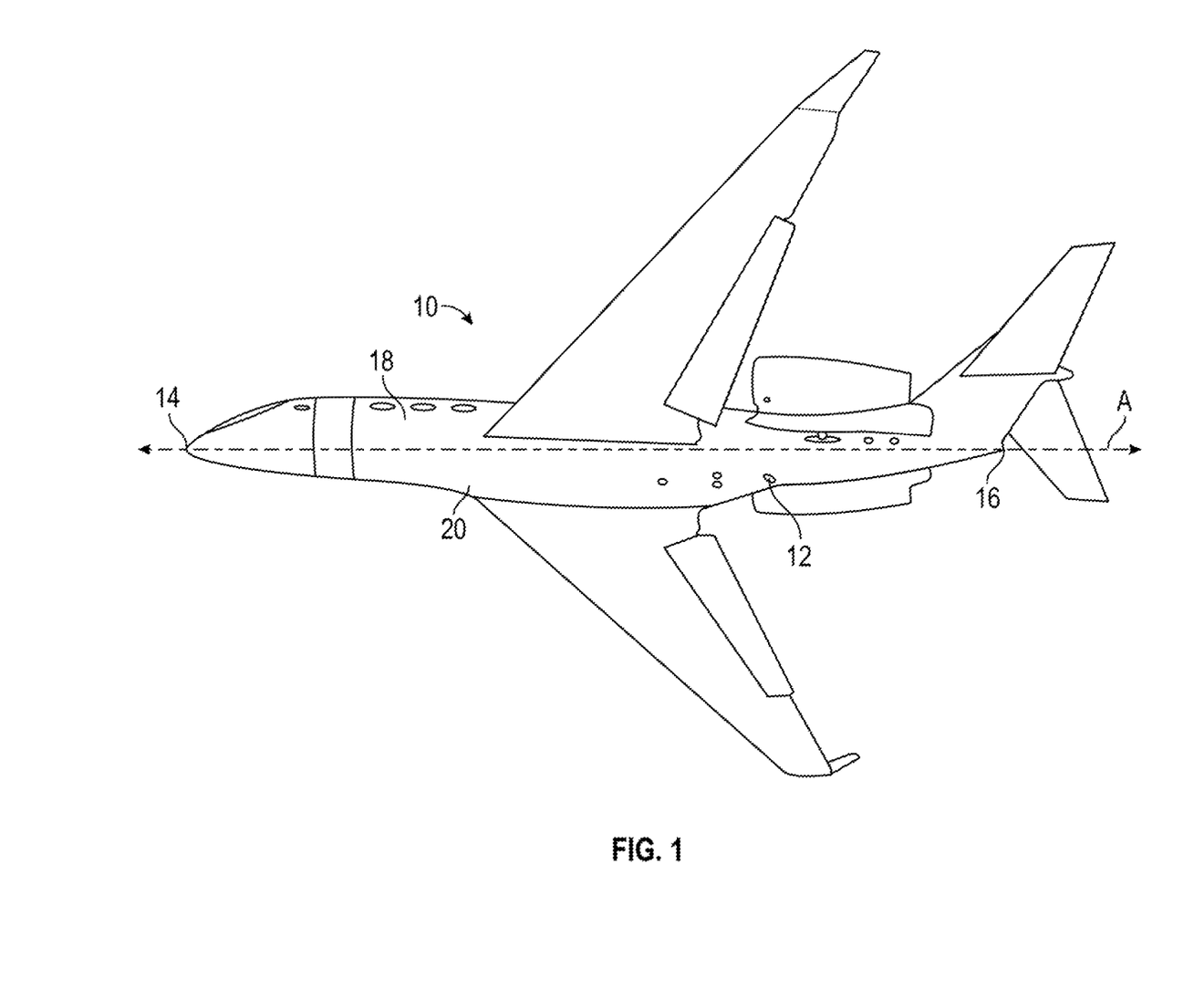
FIG. 1 is a perspective view illustrating a non-limiting embodiment of an aircraft including a drainage system.

FIG. 1 is a perspective view illustrating a non-limiting embodiment of an aircraft 10 including a drainage system 12. The aircraft 10 includes a nose 14 and a tail 16 with the aircraft 10 defining a longitudinal axis A extending through the nose 14 and the tail 16. In embodiments, the aircraft 10 includes a fuselage 18 disposed between the nose 14 and the tail 16 and a fairing 20 extending transverse to the longitudinal axis A from the fuselage 18. The drainage system 12 in fluid communication with the aircraft 10 for directing a fluid from the aircraft 10, through the drainage system 12, and to the environment. In various embodiments, the drainage system 12 is configured to direct fluids, such as oil, fuel, hydraulic fluid, and/or water. In certain embodiments, the fluid is further defined as a liquid. However, it is to be appreciated that the drainage system 12 may direct gases in addition to, or separate from, liquids.

Figure 2:
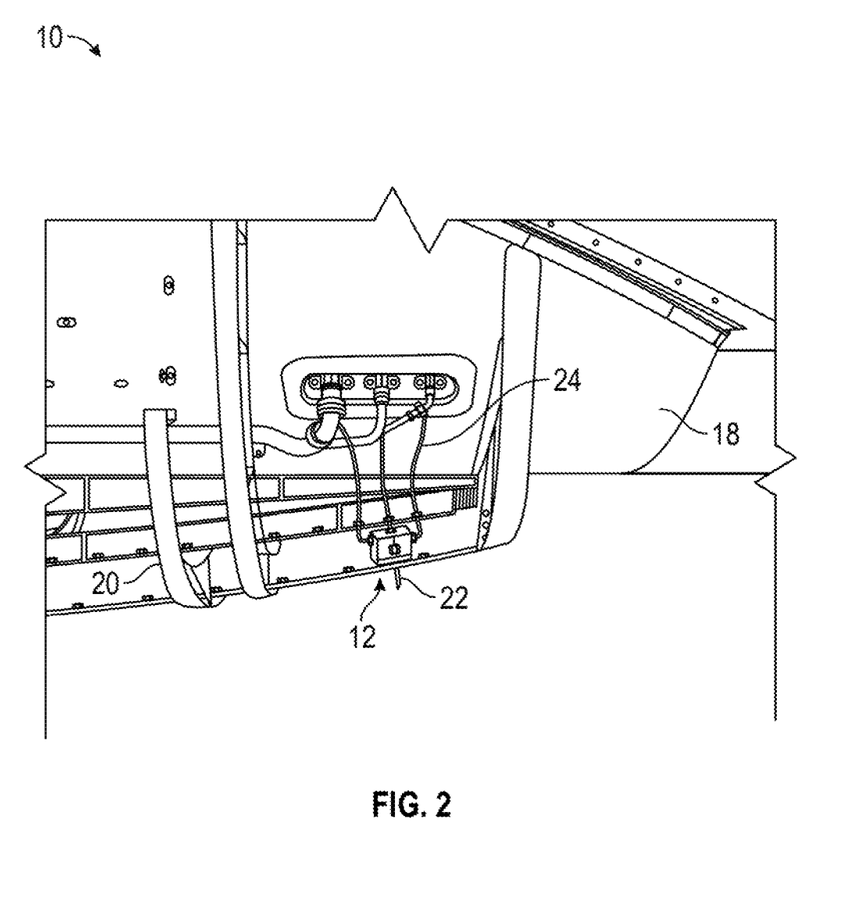
FIG. 2 is a fragmentary perspective view of a non-limiting embodiment of the drainage system of FIG. 1 including a drain tube.
Figure 3A:
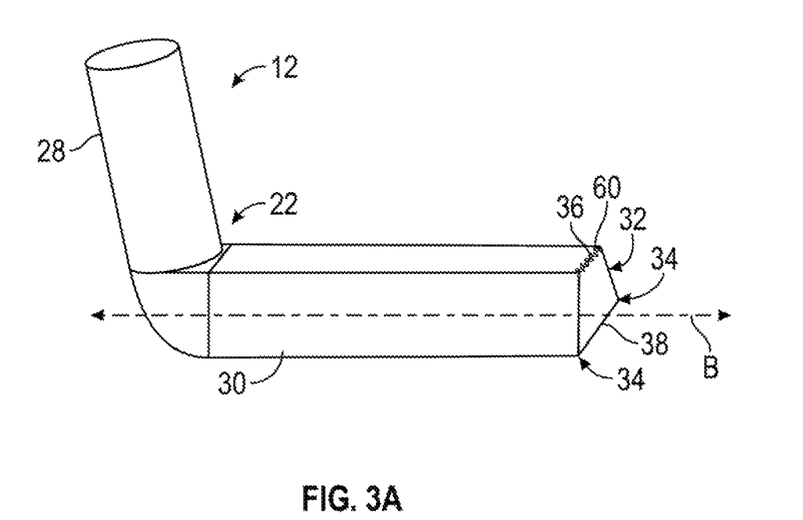
FIGS. 3A and 3B are fragmentary perspective views of a non-limiting embodiment of the drain tube of FIG. 2.
Figure 3B:
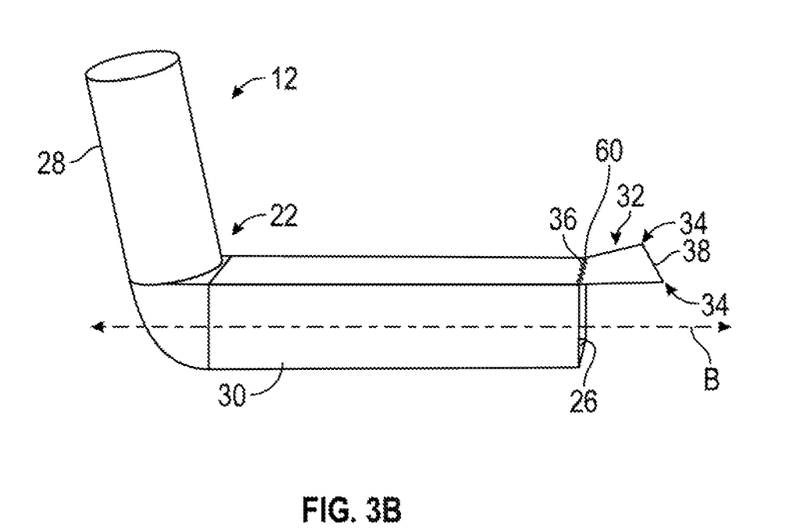
Figure 4A:
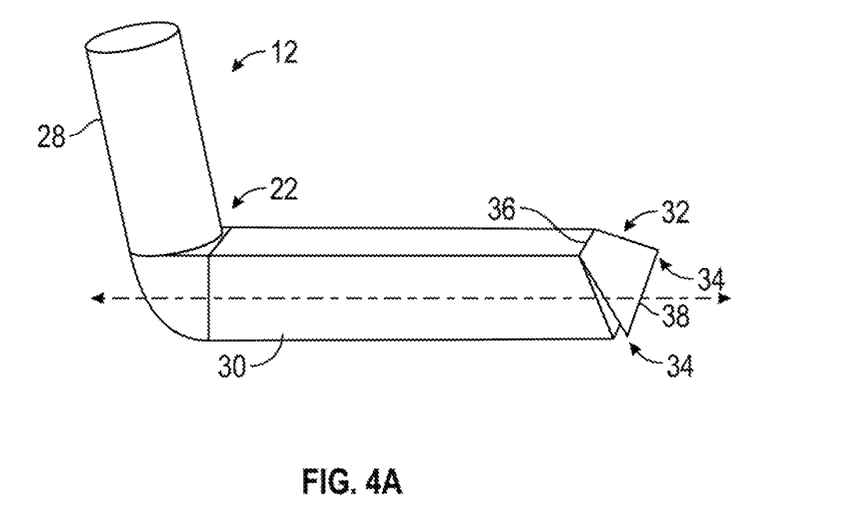
FIGS. 4A and 4B are fragmentary perspective views of another non-limiting embodiment of the drain tube of FIG. 2.
Figure 4B:
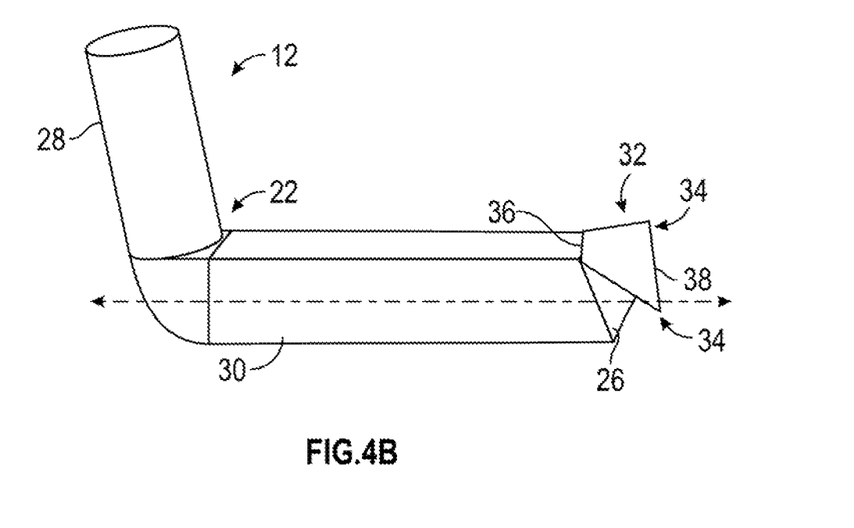
Figure 5A:
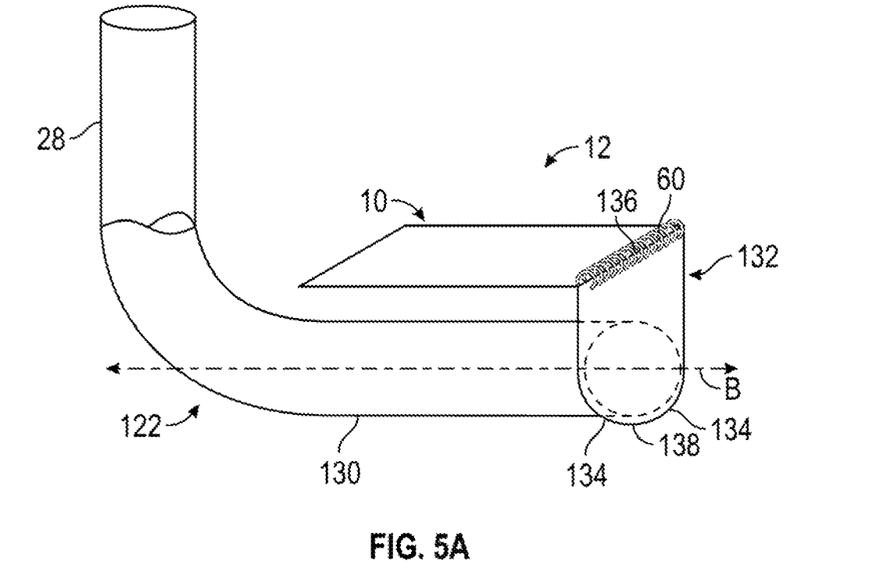
FIGS. 5A and 5B are fragmentary perspective views of another non-limiting embodiment of the drain tube of FIG. 2.
Figure 5B:
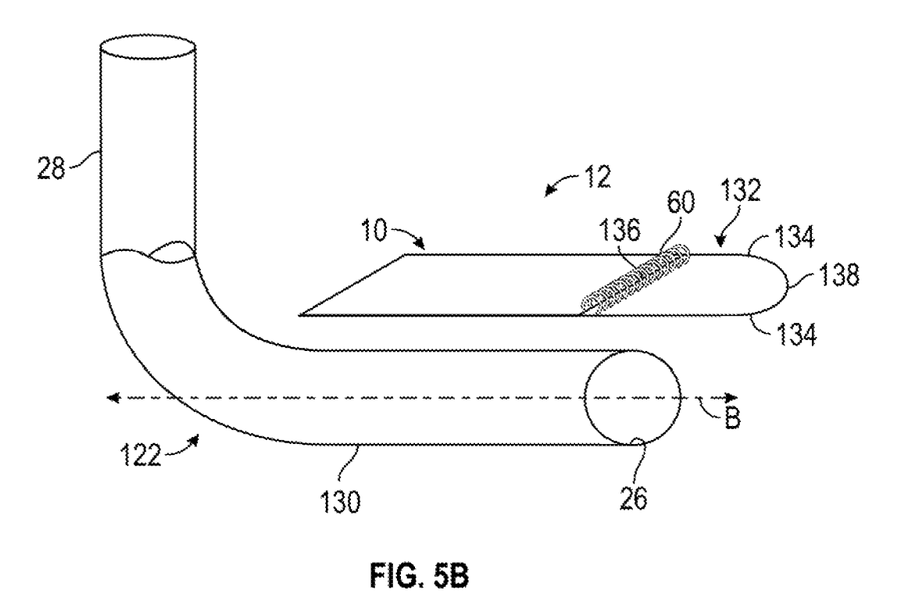
Figure 6A:
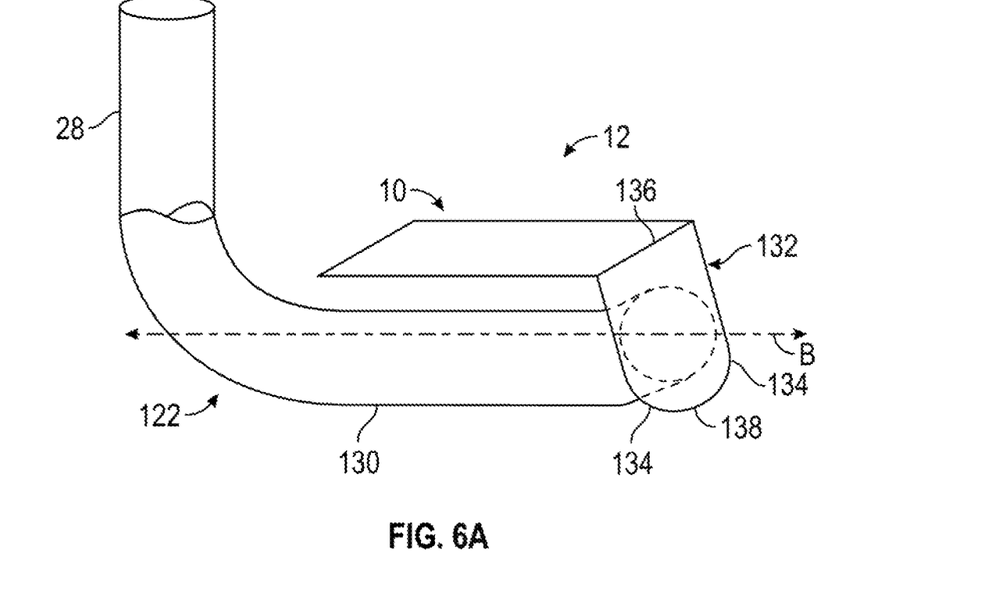
FIGS. 6A and 6B are fragmentary perspective views of another non-limiting embodiment of the drain tube of FIG. 2.
Figure 6B:
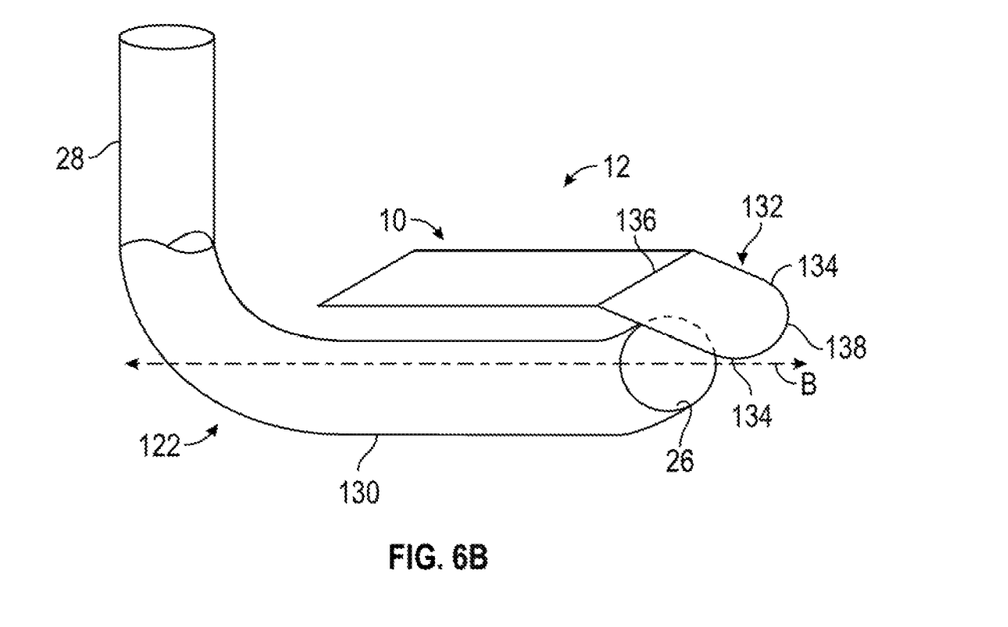

FIG. 2 is a fragmentary perspective view of a non-limiting embodiment of the drainage system 12 of FIG. 1 including a drain tube 22. As described above, drain tube 22 may also refer to drain tube 122, 222, or 322. The drain tube 22 may extend through the fairing 20 to the environment. The drainage system 12 may further include a connection tube 24 in fluid communication with the aircraft 10 and the drain tube 22 for directing a fluid to the drain tube 22. The drainage system 12 is configured to direct a fluid from the aircraft 10, to the drain tube 22, and out of the drain tube 22 to the environment. The drain tube 22 defines an orifice 26 (see FIGS. 3-11) for directing fluid out of the drain tube 22. As described above, orifice 26 may also refer to orifice 126, 226, or 326. It is to be appreciated that the drain tube 22 may define more than one orifice 26, such as two, three, four, or five orifices 26. The drain tube 22 is configured to cooperate with the freestream air outside the aircraft 10 to disperse the fluid egressing out the drain tube 22 away from the aircraft 10. The drain tube 22 may be disposed at a rear portion of the fairing 20. However, it is to be appreciated that the drain tube 22 may be disposed in other locations of the aircraft 10, such as on the fuselage 18 or on an engine nacelle, so long as the drain tube 22 is configured to cooperate with the freestream air outside the aircraft 10.

FIGS. 3-11 are fragmentary perspective views of non-limiting embodiments of the drain tube 22 of FIG. 2. The drain tube 22 may have any configuration known in the art so long as the drain tube 22 can direct a fluid from the aircraft 10 (see FIGS. 1 and 2) and the drain tube 22 can define the orifice 26. Examples of suitable configurations of the drain tube 22 include, but are not limited to, cylindrical, quadrilateral, and a combination thereof. In certain embodiments, the drain tube 22 includes a first drain tube portion 28 and a second drain tube portion 30 with the first drain tube portion 28 extending through the fairing 20 to the second drain tube portion 30. As described above, second drain tube portion 30 may also refer to second drain tube portion 130, 230, or 330. The second drain tube portion 30 may be angled relative to the first drain tube portion 28. In certain embodiments, such as the embodiments shown in FIGS. 3-9, the second drain tube portion 30 extends from the first drain tube portion 28 to the orifice 26 along a drain tube axis B. The drain tube axis B may extend, relative to the longitudinal axis A (see FIG. 1), at an angle of from +/−90° to 0°, alternatively from +/−60° to 0°, alternatively +/−45° to 0°, alternatively +/−30° to 0°, or alternatively +/−15° to 0°. In one embodiment, the drain tube axis B is generally parallel to the longitudinal axis A such that the second drain tube portion 30 extends generally parallel to the longitudinal axis A. As will be described in greater detail below, the second drain tube portion 30 extending generally parallel to the longitudinal axis A permits egress of a fluid through the orifice 26 during flight of the aircraft 10. In other embodiments, such as the embodiment shown in FIGS. 10 and 11, the drain tube 22 may extend generally linearly through the fairing 20 to the orifice 26.

The drainage system 12 further includes a cover 32 movable between a first cover position and second cover position. In certain embodiments, such as the embodiments shown in FIGS. 3, 4, and 8-11, the cover 32 may be pivotably coupled to the drain tube 22, moveably coupled to the drain tube 22, rotatably coupled to the drain tube 22, or combinations thereof. It is to be appreciated that the cover 32 may be coupled to the drain tube 22 in any manner known in the art so long as the cover 32 is movable between the first cover position and the second cover position. In other embodiments, such as the embodiments shown in FIGS. 5-7, the cover 32 may be pivotably coupled to the aircraft 10. It is to be appreciated that the cover 32 may be coupled to the aircraft 10 in any manner known in the art so long as the cover 32 is movable between the first cover position and the second cover position. The cover 32 may be moveable to additional cover positions, such as a third cover position. The additional cover positions may be before the first cover position, between the first and second cover positions, or after the second cover position. The cover positions may be defined along the drain tube 22, relative to the drain tube 22, or a combination thereof.

Referring specifically to FIGS. 3A-11A, the cover 32 is configured to overlay the orifice 26 when the cover 32 is in the first cover position. As described above, cover 32 may also refer to cover 132, 232, or 332. As utilized herein, the terminology "overlay" with regard to the cover 32 overlaying the orifice 26 means that the cover 32 may be directly on the orifice 26, or intervening elements or layers may be present where a straight line can be drawn through and between features in overlaying relationship. The cover 32 may have any configuration known in the art so long as the cover 32 can overlay the orifice 26. Examples of suitable configurations of the cover 32 include, but are not limited to, circular, cylindrical, quadrilateral, rounded quadrilateral, trapezoidal, triangular, and triangular pyramidal. In embodiments, the cover 32 is configured to sealably couple to the orifice 26 to prevent ingress of an object into the orifice 26 when the cover 32 is in the first cover position. In these embodiments, the cover 32 is configured to cooperate with the orifice 26 to substantially seal the orifice 26 from the environment when the cover 32 is in the first cover position. As utilized herein, the terminology "substantially" with regard to sealing the orifice 26 from the environment means that the cover 32 is configured to prevent ingress into the orifice 26 of objects having a diameter in an amount of greater than 0.001 millimeter (mm), alternatively greater than 0.01 mm, alternatively greater than 0.1 mm, alternatively greater than 1 mm, or alternatively greater than 10 mm. When the cover 32 substantially seals the orifice 26 from the environment, ingress into the orifice 26 by insects, such as mud wasps, is prevented.

Referring specifically to FIGS. 3B-11B, the cover 32 is further configured to expose the orifice 26 when the cover 32 is in the second cover position. In embodiments, the cover is configured to permit egress of a fluid through the orifice when the cover is in the second cover position. In these embodiments, when the orifice 26 is exposed, a fluid can egress through the orifice 26 to the environment. As utilized herein, the terminology "expose" with regard to the cover 32 exposing the orifice 26 means that fluid can move through the orifice 26 at a generally constant flow rate to the environment without significant resistance by the cover 32 to the movement of the fluid through the orifice 26. As utilized herein, the terminology "significant" with regard to resistance by the cover 32 means that the flow rate of the fluid is decreased by at least 50%, alternatively at least 25%, alternatively at least 15%, or alternatively at least 10%. It is to be appreciated that movement of fluid through the aircraft 10 and out the orifice 26 may be intermittent and thus a constant flow of fluid may not result. In one embodiment, the cover 32 moves along the drain tube 22 to expose the orifice 26. In another embodiment, the cover 32 pivots relative to the drain tube 22 to expose the orifice 26. In another embodiment, the cover 32 rotates about the drain tube to expose the orifice 26.

Referring back generally to FIGS. 3-11, the cover 32 is further configured to move between the first cover position and the second cover position in the presence of air pressure. In embodiments, the cover 32 is configured to move from the first cover position to the second cover position in the presence of air pressure. The air pressure can be derived from any source of air pressure. In embodiments, the air pressure is further defined as freestream pressure generated by the freestream air during flight of the aircraft 10. In other words, as the aircraft 10 moves through the air, the freestream air cooperates with the cover 32 to move the cover 32 to the second cover position to expose the orifice 26 thereby permitting egress of fluid through the orifice 26 to the environment.

Referring specifically to FIGS. 3-6, 8, and 10, in embodiments, the cover 32 has a bias toward the first cover position. In one embodiment, the bias is generated utilizing a mechanical biasing component, such as a spring 60 (see FIGS. 3, 5, 8, and 10). In another embodiment, the bias is generated utilizing gravity (see FIGS. 4 and 6). However, it is to be appreciated that the cover 32 may be biased toward the first cover position by any manner known in the art so long as the cover 32 can move between the first cover position and the second cover position in the presence of air pressure. As such, in embodiments when the cover 32 has the bias toward the first cover position to overlay the orifice 26, the cover 32 is configured to move against the bias to the second cover position in the presence of air pressure to expose the orifice 26.

In embodiments, the cover 32 includes an extension portion 34 extending beyond the orifice 26 when the cover 32 is in the first cover position. As described above, extension portion 34 may also refer to extension portion 134, 234, or 334. In certain embodiments, such as the embodiments shown in FIGS. 3A-7A, the extension portion 34 extends the cover 32 generally linearly when the cover 32 is in the first cover position. In other embodiments, such as the embodiments shown in FIGS. 8A and 9A, the extension portion 234 extends the cover 232 about the drain tube 222 when the cover 232 is in the first cover position. In various embodiments, such as the embodiments shown in FIGS. 10A and 11A, the extension portion 334 extends the cover 332 away from the orifice 26 when the cover 332 is in the first cover position. In embodiments, the extension portion 34 is configured to cooperate with the freestream air to move the cover 32 against the bias to the second cover position. The extension portion 34 may be configured to extend into the freestream air during flight of the aircraft 10 such that the freestream pressure generated by the freestream air moves the cover 32 against the bias from the first cover position to the second cover position.

Referring specifically to FIGS. 3-7, in embodiments, the cover 32 has a first side 36 having a first side length and a second side 38 having a second side length with the first side 36 spaced from the second side 38. As described above, first side 36 may also refer to first side 136 and second side 38 may also refer to second side 138. In certain embodiments, such as in the embodiments shown in FIGS. 3 and 4, the second side length is greater than the first side length. The second side length may be greater than the first side length in an amount of from at least 5%, alternatively at least 10%, alternatively at least 25%, or alternatively at least 50% based on the first side length. In one embodiment, the cover 32 has a trapezoidal configuration (see FIGS. 3 and 4). In another embodiment, the cover 32 has a rounded quadrilateral configuration (see FIGS. 5-7). The second side 38 may extend beyond the orifice 26 to define the extension portion 34 such that the freestream pressure generated by the freestream air moves the cover 32 against the bias from the first cover position to the second cover position. The first side 36 may extend to completely cover the orifice 26 such that the cover 32 substantially seals the orifice 26 from the environment when the cover 32 is in the first cover position.

In embodiments, the first side 36 is pivotably coupled to the drain tube 22 and the cover 32 is configured to pivot between the first cover position and the second cover position. In these embodiments, when the cover 32 moves from the first cover position to the second cover position, the cover 32 pivots away from the orifice 26. In certain embodiments, such as the embodiment shown in FIGS. 3 and 5, the cover 32 includes the spring 60 configured to cooperate with the cover 32 and the drain tube 22 to bias the cover 32 toward the first cover position. In one embodiment, the spring 60 is disposed along a hinge axis between the drain tube 22 and the cover 32. In other embodiments, such as the embodiment shown in FIGS. 4 and 6, the cover 32 is configured to bias toward the first cover position by gravity when the aircraft 10 is on the ground. It is to be appreciated that the cover 32 may be configured to bias toward the first cover position by gravity at other orientations and states of the aircraft 10 (e.g., on the ground, during flight, during take-off, during approach, etc.). The orifice 26 may be angled toward the fuselage 18 in embodiments when the drain tube 22 includes the second drain tube portion 30 extending along the drain tube axis B such that the cover 32 is biased toward the first cover position by gravity. The orifice 26 may angled toward the fuselage 18, relative to the drain tube axis B, at an angle of from 90° to 0°, alternatively from 70° to 0°, alternatively 60° to 10°, alternatively 50° to 10°, or alternatively 40° to 20°. In one embodiment, the orifice 26 is angled toward the fuselage 18, relative to the drain tube axis B, at an angle of 30°.

Figure 8A:
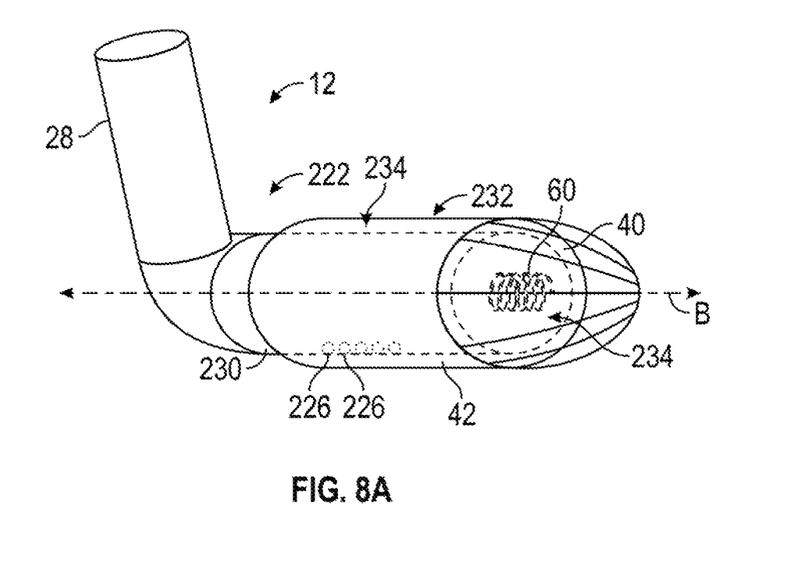
FIGS. 8A and 8B are fragmentary perspective views of another non-limiting embodiment of the drain tube of FIG. 2.
Figure 8B:
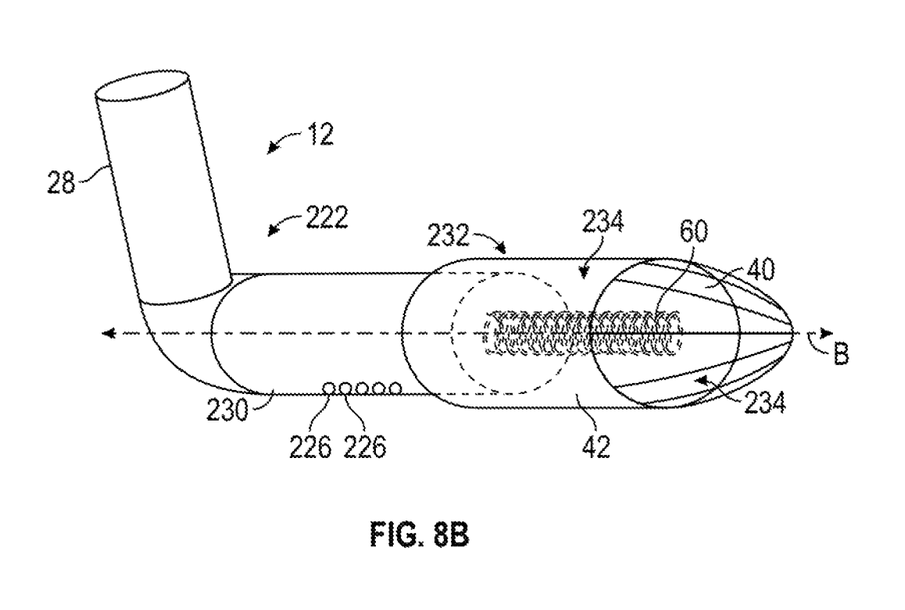
Figure 9A:
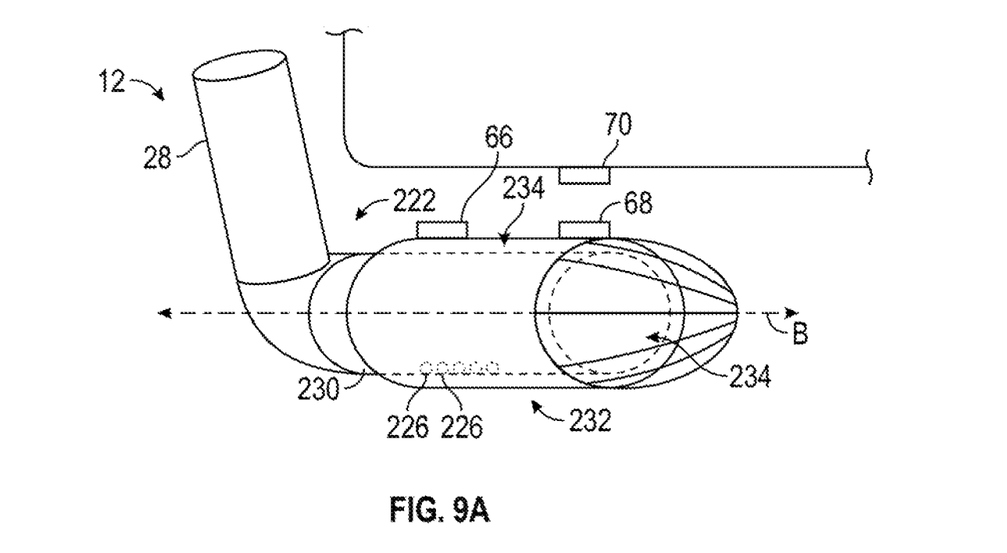
FIGS. 9A and 9B are fragmentary perspective views of another non-limiting embodiment of the drain tube of FIG. 2.
Figure 9B:
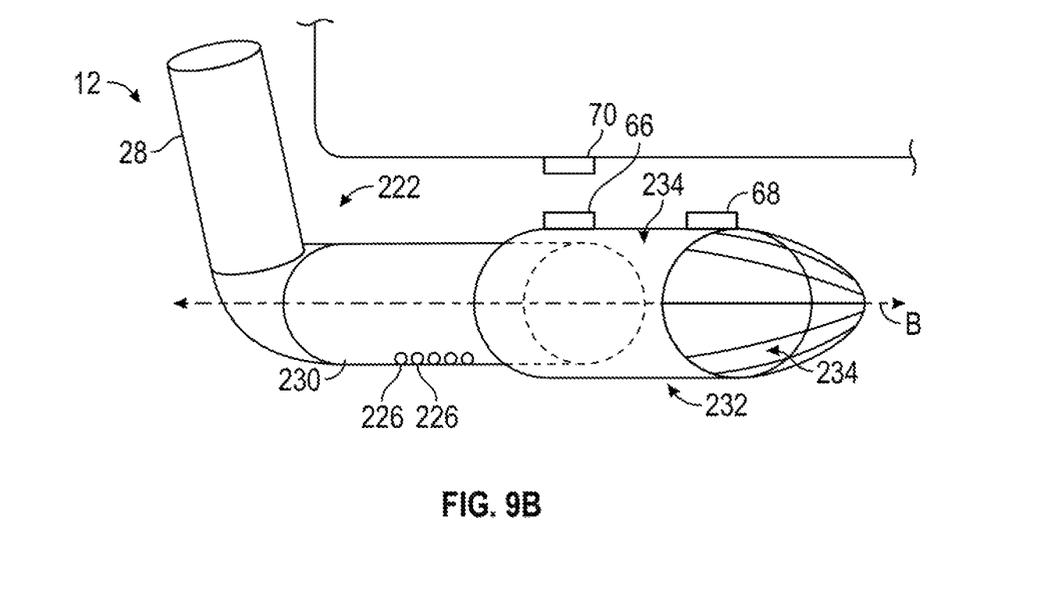

Referring specifically to FIGS. 8 and 9, in embodiments, the cover 232 includes a base 40 and a shell 42 extending from the base 40. The base 40 may have a generally circular configuration and the shell 42 may have a generally cylindrical configuration extending from the base 40. In embodiments, the shell 42 is configured to overlay the orifice 226 and the base 40 is oriented transverse to and in line with the drain tube axis B. The base 40 may define the extension portion 234. In certain embodiments, the base 40 and a portion of the shell 42 define the extension portion 234 such that the freestream pressure generated by the freestream air moves the cover 232 against the bias from the first cover position to the second cover position. The shell 42 may extend to completely cover the orifice 226 such that the cover 232 substantially seals the orifice 226 from the environment when the cover 232 is in the first cover position.

In embodiments, the shell 42 is slidably coupled to the drain tube 222 and the cover 232 is configured to slide between the first cover position and the second cover position. In these embodiments, when the cover 232 moves from the first cover position to the second cover position, the cover 232 slides away from the orifice 226. In certain embodiments, the cover 232 includes the spring 60 configured to cooperate with the cover 232 and the drain tube 222 to bias the cover 232 toward the first cover position.

Figure 10A:
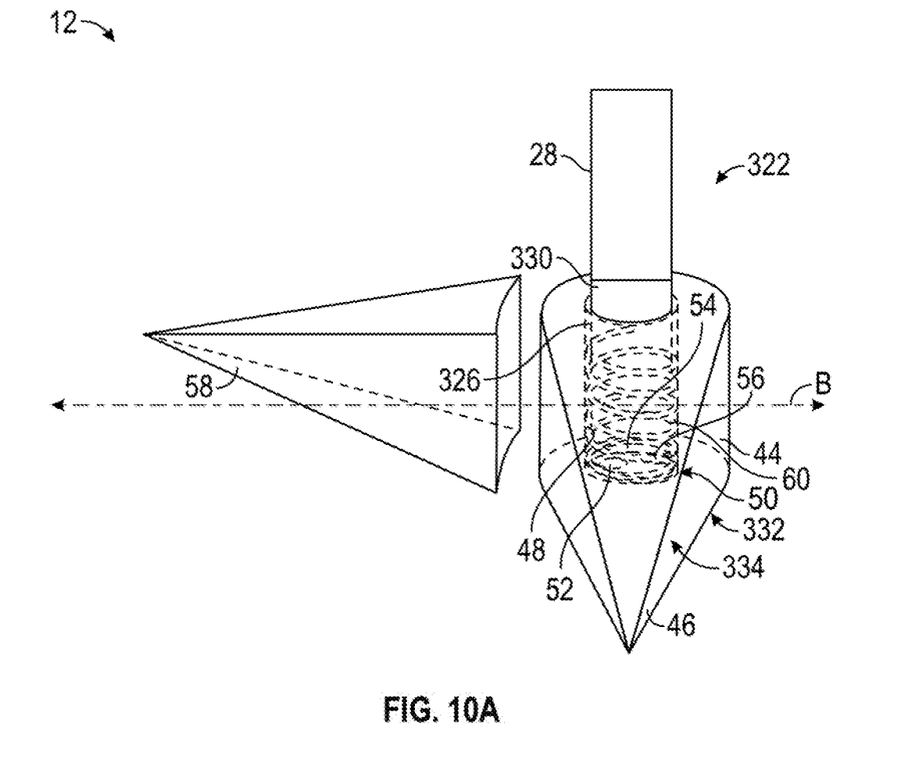
FIGS. 10A and 10B are fragmentary perspective views of another non-limiting embodiment of the drain tube of FIG. 2.
Figure 10B:
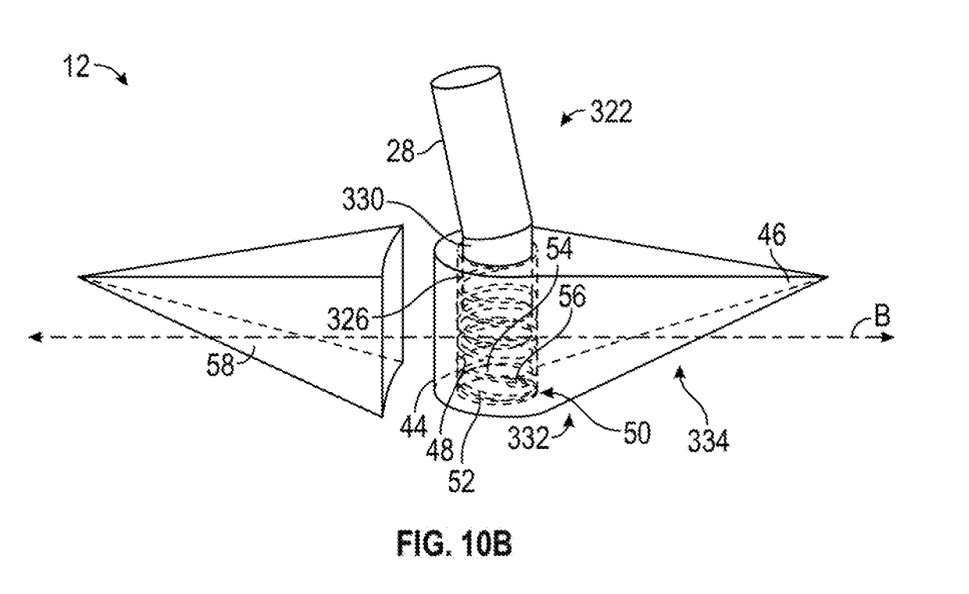
Figure 11A:
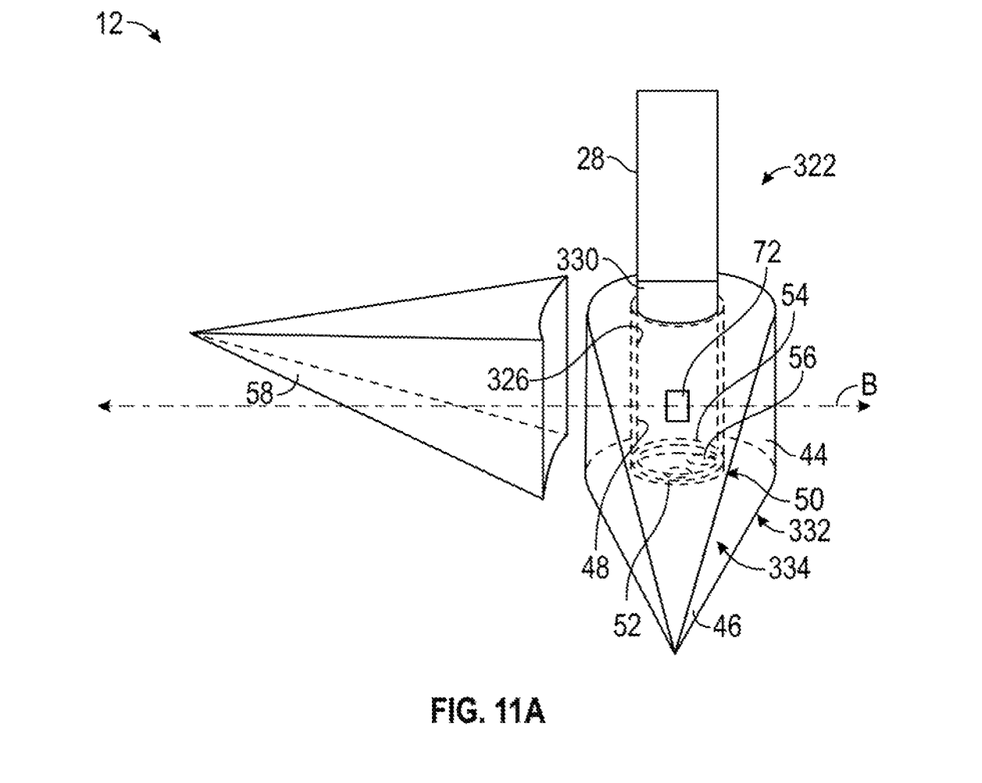
FIGS. 11A and 11B are fragmentary perspective views of another non-limiting embodiment of the drain tube of FIG. 2.
Figure 11B:
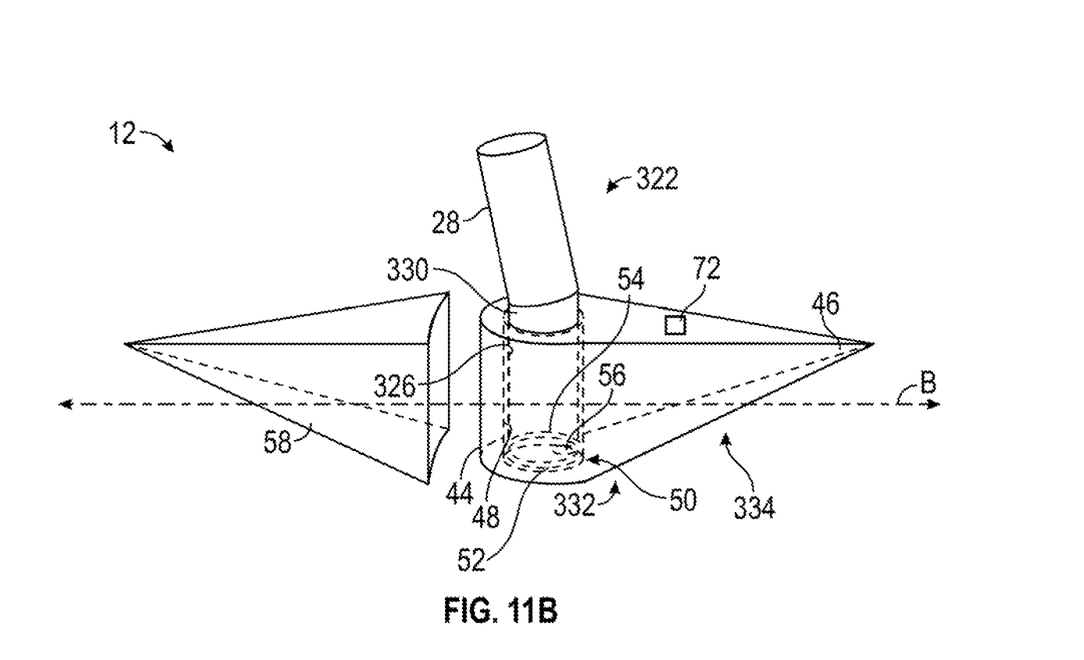

Referring specifically to FIGS. 10 and 11, in embodiments, the cover 332 includes a hinge portion 44 and a lever portion 46 extending from the hinge portion 44. The hinge portion 44 may have a generally cylindrical configuration and the lever portion 46 may have a generally triangular pyramidal configuration extending from the hinge portion 44. The hinge portion 44 may define a channel 48 extending through the cover 332. In embodiments, the channel 48 is configured to receive the drain tube 322 such that the hinge portion 44 is configured to overlay the orifice 326. The lever portion 46 may extend beyond the orifice 326 to define the extension portion 334 such that the freestream pressure generated by the freestream air moves the cover 332 against the bias from the first cover position to the second cover position. The cover 332 may include a sealing component 50 disposed in the channel 48. The sealing component 50 may have a closed state when the cover 332 is in the first cover position and an open state when the cover 332 is in the second cover position. In embodiments, the cover 332 substantially seals the orifice 326 from the environment when the sealing component 50 is in the closed state and thus when the cover 332 is in the first cover position. Fluid can egress through the orifice 326 to the environment when the sealing component 50 is in the open state and thus when the cover 332 is in the second cover position. In certain embodiments, the sealing component 50 includes a fixed portion 52 coupled to the drain tube 322 and partially overlaying the orifice 326, and a rotatable portion 54 coupled to the cover 332 and adjacent the fixed portion 52. The rotatable portion 54 is configured to rotate relative to the fixed portion 52 when the cover 332 moves between the first cover position and the second cover position. The rotatable portion 54 is configured to substantially seal the orifice 326 from the environment when the sealing component 50 is in the closed state. The rotatable portion 54 defines a hole 56 configured to align with the orifice 326 when the sealing component 50 is in the open state thereby permitting egress of a fluid through the orifice 326 to the environment when the sealing component 50 is in the open state.

In embodiments, the hinge portion 44 is rotatably coupled to the drain tube 322 and the cover 332 is configured to rotate between the first cover position and the second cover position. The lever portion 46 may be configured to cooperate with the freestream air to move the cover 332 against the bias to the second cover position. The cover 332 may further include an aerodynamic component 58 configured to direct the freestream air toward lever portion 46 to improve cooperation between the freestream air and the lever portion 46. In these embodiments, when the cover 332 moves from the first cover position to the second cover position, the sealing component 50 moves from the closed state to the open state. In certain embodiments, the cover 332 includes the spring 60 configured to cooperate with the cover 332 and the drain tube 322 to bias the cover 332 toward the first cover position.

Figure 7A:
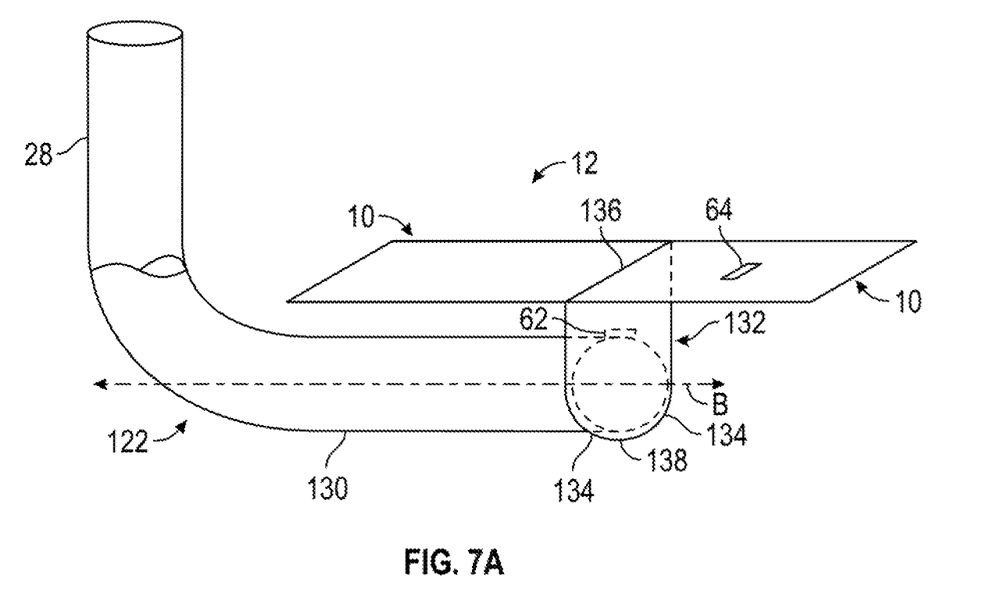
FIGS. 7A and 7B are fragmentary perspective views of another non-limiting embodiment of the drain tube of FIG. 2.
Figure 7B:
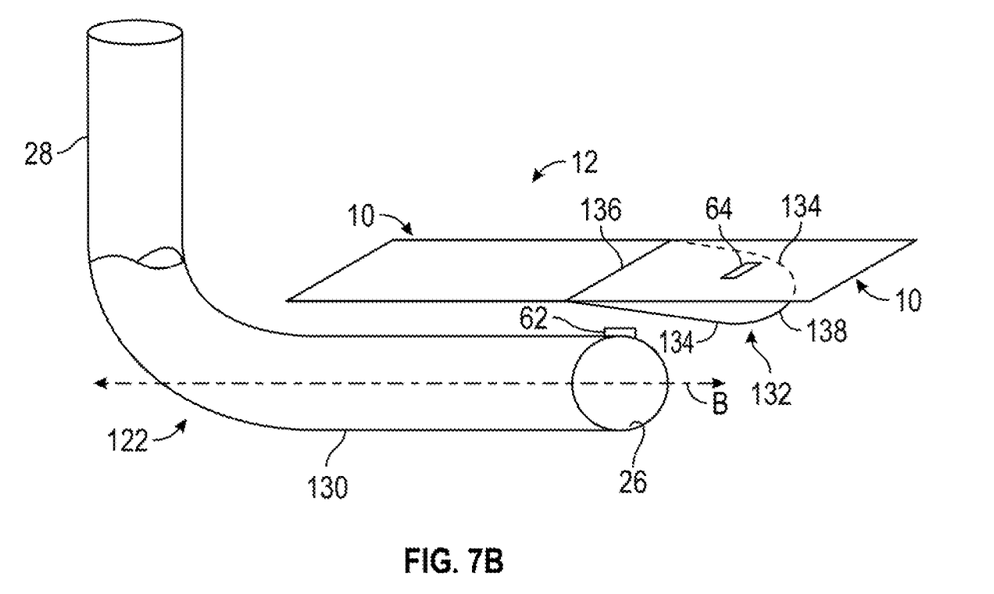

Referring specifically to FIGS. 7, 9, and 11, in embodiments, the drainage system 12 further includes a magnet configured to maintain the cover 32 in first cover position or the second cover position. In embodiments, the drainage system 12 may include one or more magnets. The magnets may be coupled to the drain tube 22, the cover 32, the aircraft 10, or combinations thereof. When the cover 32 is in the first cover position, the cover 32 may be configured to disengage from a magnet when the cover 32 is in the presence of air pressure to expose the orifice 26. The cover 32 may be moved between the first cover position and the second cover position manually, such as by hand, by engaging and disengaging the magnets. For example, prior to take-off of the aircraft 10, a user may move the cover 32 from the first cover position to the second cover position to expose the orifice 26. Further, after landing of the aircraft 10, a user may move the cover 32 from the second cover position to the first cover position to prevent ingress of objects into the orifice 26. If a user neglected to move the cover 32 from the first cover position to the second cover position prior to take-off, the cover 32 is configured to disengage from the magnet when the cover 32 is in the presence of air pressure to expose the orifice 26, as described above.

In certain embodiments, such as the embodiment shown in FIG. 7, the drainage system 12 includes a drain tube magnet 62 coupled to the drain tube 22 and an aircraft magnet 64 coupled to the aircraft 10. The cover 32 may be formed of a metal-containing material thereby rendering the cover 32 attracted to the magnets. However, it is to be appreciated that the cover 32 may include a magnet for engaging the drain tube magnet 62 and the aircraft magnet 64. The drain tube magnet 62 is configured to engage the cover 32 when the cover 32 is in the first cover position. The aircraft magnet 64 is configured to engage the cover 32 when the cover 32 is in the second cover position. Moreover, the cover 32 is configured to disengage from the drain tube magnet 62 when the cover 32 is in the presence of air pressure to expose the orifice 26. In embodiments, the force of the air pressure is greater than the force of attraction between the drain tube magnet 62 and the cover 32 when the cover 32 is in the first cover position. It is to be appreciated that the cover 32 may be moved between the first cover position and the second cover position manually, such as by hand, by engaging the cover 32 with the drain tube magnet 62 or the aircraft magnet 64.

In various embodiments, such as the embodiment shown in FIG. 9, the drainage system 12 includes a first cover magnet 66 coupled to the cover 32 and a second cover magnet 68 also coupled to the cover 32 and spaced from the first cover magnet 66. The drainage system 12 may further include a positioning magnet 70 coupled to the aircraft 10 and configured to interact with the first cover magnet 66 and the second cover magnet 68. The first cover magnet 66 is configured to engage the positioning magnet 70 when the cover 32 is in the first cover position. The second cover magnet 68 is configured to engage the positioning magnet 70 when the cover 32 is in the second cover position. Moreover, the first cover magnet 66 is configured to disengage from the positioning magnet 70 when the cover 32 is in the presence of air pressure to expose the orifice 26. In embodiments, the force of the air pressure is greater than the force of attraction between the first cover magnet 66 and the positioning magnet 70 when the cover 32 is in the first cover position. It is to be appreciated that the cover 32 may be moved between the first cover position and the second cover position manually, such as by hand, by engaging the first cover magnet 66 or the second cover magnet 68 with the positioning magnet 70.

In other embodiments, such as the embodiment shown in FIG. 11, the drainage system 12 includes a first fuselage magnet (not shown) coupled to the aircraft 10 and a second fuselage magnet (not shown) also coupled to the aircraft 10 and spaced from the first fuselage magnet. The drainage system 12 may further include a lever magnet 72 coupled to the cover 32 and configured to interact with the first fuselage magnet and the second fuselage magnet. The lever magnet 72 is configured to engage the first fuselage magnet when the cover 32 is in the first cover position. The lever magnet 72 is also configured to engage the second fuselage magnet when the cover 32 is in the second cover position. Moreover, the lever magnet 72 is configured to disengage from the first fuselage magnet when the cover 32 is in the presence of air pressure to expose the orifice 26. In embodiments, the force of the air pressure is greater than the force of attraction between the lever magnet 72 and the first fuselage magnet when the cover 32 is in the first cover position. It is to be appreciated that the cover 32 may be moved between the first cover position and the second cover position manually, such as by hand, by engaging the lever magnet 72 with the first fuselage magnet or the second fuselage magnet.

In certain embodiments, the drainage system 12 includes one or more indicia, such as a colored indicator, which provides a user visual indication as to whether the cover 32 is in the first cover position and the second cover position. For example, in embodiments, the fuselage 18 may be colored red in an area covered from view by the cover 32 when the cover 32 is in the second cover position and visible when the cover 32 is in the first cover position. Therefore, the user is able to see when the cover 32 is in the first cover position based on the visibility of the red colored area. In another embodiment, an inner surface of the cover 32 may be colored green and an outer surface of the cover 32 may be colored red such that when the cover 32 is in the first cover position, a user can visualize the red color and when the cover 32 is in second cover position, a user can visualize the green color.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A drainage system for an aircraft, the drainage system comprising:
   a drain tube defining an orifice; and
   a cover movable between a first cover position and a second cover position, the cover configured to overlay the orifice when the cover is in the first cover position, the cover configured to expose the orifice when the cover is in the second cover position, wherein the cover is configured to cooperate with a freestream air flow for moving the cover from the first cover position to the second cover position.

2. The drainage system of claim 1, wherein the freestream air flow generates an air pressure gradient on the cover during flight of the aircraft.

3. The drainage system of claim 2, wherein the cover comprises an extension portion extending beyond the orifice when the cover is in the first cover position and a bias toward the first cover position, wherein the freestream air flow moves the cover against the bias to the second cover position.

4. The drainage system of claim 3, wherein the cover has a first side having a first side length and a second side having a second side length with the first side spaced from the second side, the second side length is greater than the first side length, and the second side extends beyond the orifice to define the extension portion.

5. The drainage system of claim 4, wherein the first side is pivotably coupled to the drain tube and the cover is configured to pivot between the first cover position and the second cover position.

6. The drainage system of claim 3, wherein the cover comprises a base and a shell extending from the base, the shell is configured to overlay the orifice, and the base defines the extension portion.

7. The drainage system of claim 6, wherein the shell is slidably coupled to the drain tube and the cover is configured to slide between the first cover position and the second cover position.

8. The drainage system of claim 3, wherein the cover comprises a hinge portion and a lever portion extending from the hinge portion, the hinge portion is configured to overlay the orifice, and the lever portion defines the extension portion.

9. The drainage system of claim 8, wherein the hinge portion is rotatably coupled to the drain tube and the cover is configured to rotate between the first cover position and the second cover position.

10. The drainage system of claim 1, wherein the cover is configured to sealably couple to the orifice to prevent ingress of an object into the orifice when the cover is in the first cover position.

11. The drainage system of claim 1, wherein the cover is configured to permit egress of a fluid through the orifice when the cover is in the second cover position.

12. The drainage system of claim 1, wherein the cover comprises a spring configured to cooperate with the cover and the drain tube to bias the cover toward the first cover position.

13. The drainage system of claim 1, wherein the cover is configured to bias toward the first cover position by gravity when the aircraft is on the ground.

14. The drainage system of claim 1 further comprising a magnet configured to maintain the cover in first cover position or the second cover position.

15. An aircraft comprising a drainage system, the drainage system comprising:
 a drain tube in fluid communication with the aircraft and defining an orifice; and
 a cover movable between a first cover position and second cover position, the cover configured to overlay the orifice when the cover is in the first cover position, the cover configured to expose the orifice when the cover is in the second cover position, wherein the cover is configured to cooperated with a freestream air flow for moving the cover from the first position to the second position.

16. The aircraft of claim 15, wherein the freestream air flow generates an air pressure gradient on the cover during flight of the aircraft and wherein the cover comprises an extension portion extending beyond the orifice when the cover is in the first cover position and a bias toward the first cover position, and the extension portion is configured to cooperate with the air pressure gradient to move the cover against the bias to the second cover position.

17. The aircraft of claim 16, wherein the cover has a first side having a first side length and a second side having a second side length with the first side spaced from the second side, the second side length is greater than the first side length, and the second side extends beyond the orifice to define the extension portion, and wherein the first side is pivotably coupled to the drain tube and the cover is configured to pivot between the first cover position and the second cover position.

18. The aircraft of claim 16, wherein the cover comprises a base and a shell extending from the base, the shell is configured to overlay the orifice, and the base defines the extension portion, and wherein the shell is slidably coupled to the drain tube and the cover is configured to slide between the first cover position and the second cover position.

19. The aircraft of claim 16, wherein the cover comprises a hinge portion and a lever portion extending from the hinge portion, the hinge portion is configured to overlay the orifice, and the lever portion defines the extension portion, and wherein the hinge portion is rotatably coupled to the drain tube and the cover is configured to rotate between the first cover position and the second cover position.

20. The aircraft of claim 15, wherein the cover is configured to sealably couple to the orifice to prevent ingress of an object into the orifice when the cover is in the first cover position, and wherein the cover is configured to permit egress of a fluid through the orifice when the cover is in the second cover position.

* * * * *